Patented Mar. 7, 1939

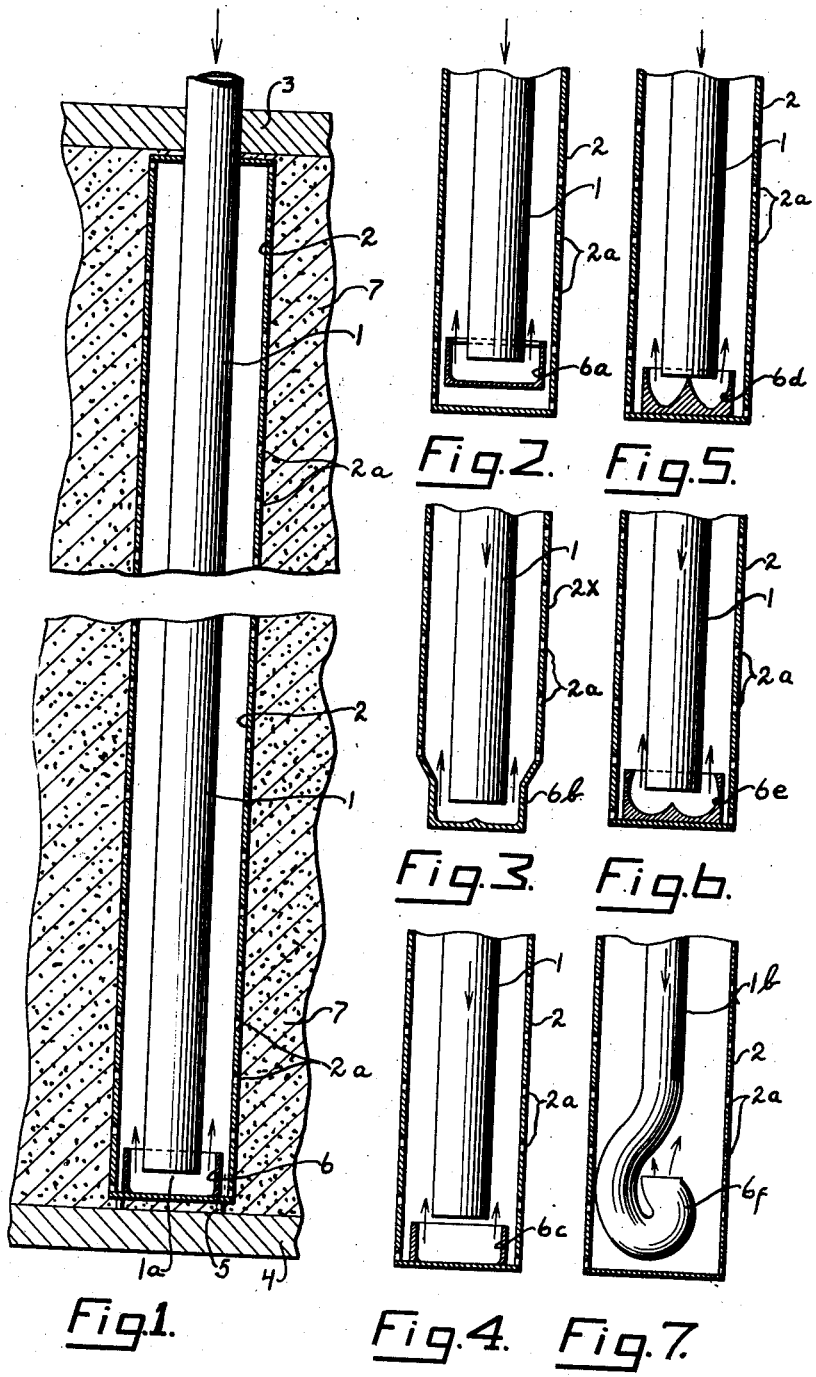

2,149,299

UNITED STATES PATENT OFFICE 2,149,299

FLUID DISTRIBUTION

Raymond C. Lassiat, Woodbury, N. J., assignor to Houdry Process Corporation, Dover, Del., a corporation of Delaware Application October 11, 1935, Serial No. 44,516

4 Claims. (Cl. 23—288)

This inventiin relates to the art of controlling the flow and distribution of fluids and has particular application in the reverse flow or return flow passage of fluids. Such reverse flow may be accomplished, for example, within a double or nested conduit element wherein a smaller conduit or tube is telescoped within a larger conduit, which latter may be perforated when desired.

The practical application and utility of such type of apparatus and the character of fluid flow referred to may be exemplified in certain modes of refining hydrocarbons, such as applied in the catalytic cracking or reforming thereof, as well as in other types of operations, including various contacting operations. U. S. Patent No. 1,992,946, issued to J. W. Harrison on March 5, 1935, particularly Fig. 1 thereof, illustrates apparatus of this general type wherein return-flow or reverse-flow conduits arranged in parallelism within a converter, are employed. Such double conduits and reverse flow passage of fluids are useful in effecting desired heat exchange and in introducing fluids into a reaction chamber or into contact with reaction mass at substantially uniform temperatures throughout the length of such conduits.

Heretofore it has been customary to effect reversal of flow of fluids in such double or nested conduits, for example, by having the open end of the inner conduit spaced somewhat from the end of the outer conduit, allowing the stream of fluid to be directed against the end of the outer conduit, thereby to cause the direction thereof to be reversed and the stream to flow through the annular passage between the inner and outer conduits. The outer conduit is ordinarily uniformly perforated along its length and, in such case, fluid will be emitted from the conduit through the perforations or openings along the length thereof and, for example, will pass into contact with a catalyst or contact mass.

Where such a system of contacting a fluid was employed, particularly where the fluid was a heavy hydrocarbon from which it was desired to produce gasoline, I found that under certain conditions of operation a reaction was occurring within the contact mass which was non-uniform along the length of the conduits, as evidenced by non-uniform deposits of carbonaceous and other materials and non-uniform temperatures along the length thereof. Many possible causes of this very undesirable condition were investigated and finally I discovered that these non-uniform conditions were apparently due to a somewhat non-uniform introduction of fluid into the contact mass along the lengths of the perforated distributing conduits. This tendency away from uniformity appeared more or less pronounced, dependent upon the structural design of the converter and operative conditions, particularly feed rate. It is recognized that certain apparatus has been developed which, when designed for a particular or narrow range of feed rates, will provide a substantially uniform introduction of fluid. However, when such apparatus has been employed for widely varying conditions of operation and feed rates, substantial non-uniformity of operation occurred in the case of many of such conditions and feed rates. In the use of such apparatus, the operator either had to forego flexibility of feed rates, for example, or else he had to sacrifice uniformity throughout the contact mass, at least to some extent. Regardless of what theoretical analysis of the difficulty is the correct one, I have found that non-uniformity of reaction can be substantially obviated by use of certain apparatus and modifications which are the subject matter of this invention.

It is a major object of my invention to overcome non-uniformity and unbalanced conditions of reaction, particularly in connection with contacting operations, and still provide for flexibility of operation. Other objects include uniform distribution of fluids or reactants throughout the depth of a contact mass or throughout the length of perforated conduits, such as the double or nested conduits hereinabove mentioned. To accomplish these and other objects and advantages, which will appear from the specification as a whole, without substantially interfering with or adversely affecting heat exchange conditions between fluids within the conduits and the contact mass and to provide for flexibility of feed rates, are salient companion objects.

Suitable illustrative apparatus for carrying the invention into operation can be most quickly understood by reference to the accompanying drawing, in which:

Fig. 1 shows an elevational view in section of a double or nested conduit having a cup-like structure facing the open end of the inner conduit and affixed to the end of the outer conduit, embedded within a contact mass within a reaction chamber, which latter is indicated by a broken-away view;

Fig. 2 shows, in broken-away section, a double conduit similar to that presented in Fig. 1, but with the cup-like structure affixed to the inner conduit;

Fig. 3 is similar to Fig. 2, except that the cup-like structure is formed by contracting the end of the outer conduit adjacent the open end of the inner conduit;

Fig. 4 is like Fig. 2, except that the top of the cup-like structure is located slightly below but nearly flush with the open end of the inner conduit;

Fig. 5 is like Fig. 2, except that the central portion of the cup-like element is raised and the surfaces extending therefrom are smoothly curved around to meet the top of the element;

Fig. 6 is quite similar to Fig. 5, except that the central portion of the cup-like element is not raised to the same magnitude and the curved surfaces, where they meet the top of the element, are directed somewhat inwardly, rather than straight up, the degree of inward curvature being shown somewhat exaggerated for the sake of emphasis; and Fig. 7 is similar to Fig. 6 except the cup-like structure is omitted and, in its place, the open end of the inner conduit is turned back in the form of a curved loop.

In the several figures of the drawing, like numerals denote similar parts.

The double or nested conduit shown in Fig. 1 is made up of inner conduit 1 and outer conduit 2, the former having an open end 1a and the latter having perforations 2a. The extended end of inner conduit 1 is mounted in tube sheet 3 of a suitable converter, which is shown broken away, and may communicate with a manifolding chamber or duct as desired. When it communicates with a manifolding chamber, it ordinarily will be approximately flush with the upper side of tube sheet 3. A plurality of similar double conduits correspondingly mounted are arranged in parallelism within the converter. The lower end of each double conduit is spaced somewhat from lower sheet 4 of the converter, which may or may not have withdrawal or outlet conduits mounted therein. Attached to and projecting from sheet 4 are guides 5, which may, for example, be three in number and be spaced one from another around each conduit, serving to keep the same in desired position without covering the openings therein. Cylindrical member 6 forms a shallow cup-like structure with the closed end of outer, perforated conduit 2. Contact mass 7 surrounds the perforated conduit and extends from end to end of the reaction chamber.

Fluids, for example, reactants such as vaporized hydrocarbons which, for the sake of a definite illustration, may be of the gas oil range, are introduced through the inner conduit 1 in the direction indicated. They emerge through the open end 1a thereof and are directed against the bottom of the adjacent cup-like structure formed by members 6. The direction of fluid flow is reversed and the fluid passes up, as indicated, through the annular passage between conduits 1 and 2. A portion of the fluid diffuses around the top of member 6 and passes down through the annular space formed between it and outer conduit 2, to feed the outlet perforations adjacent the member.

The pressure existing within and especially adjacent the bottom of the cup-like structure is relatively high compared with that existing at the top of the cup or thereabove. This high pressure is due to the fact that the fluid stream comes to zero velocity at this point and the kinetic energy of the stream is stored up as potential energy in the form of a pressure head. This relatively high pressure is confined by the cup-like structure away from adjacent outlet openings in outer conduit 2, thereby avoiding a disproportionately high rate of flow therethrough.

Slight additional description will be required to make clear the variations shown by the other figures of the drawing.

In Fig. 2 the cup-like element 6a is attached to the inner conduit 1. This structure provides certain advantages over that shown in Fig. 1. For example, its degree of insertion in the cup-like element is independent of relative elongation or contraction of the inner and outer members of the telescoped or nested conduits.

In Fig. 3 cup-like structure 6b is formed by contraction of the end of outer conduit 2X. Figs. 4, 5 and 6 require no further discussion, in view of the above description, to make them understandable, cup-like members 6c, 6d and 6e corresponding to member 6 of Fig. 1.

In Fig. 7, of course, the curved, looped end 6f of the conduit 1b serves the same function, in a general way, as do the cup-like structures illustrated in Figs. 1 to 6.

In amplification of the description given hereinabove and without intending to limit the scope of the invention in any way, but rather to promote a more complete understanding of the same, a further explanation or theorization of the greatly improved operation of the converter which is effected by the uniformity of fluid distribution resulting where my invention is employed, seems desirable. It involves the pressure head which builds up at the place where fluid flow is reversed, as above indicated. Where this zone of high pressure is allowed to extend to perforations or openings in the outer conduit, a relatively high rate of discharge seems to result. However, after the fluid has again assumed some appreciable velocity of motion, away from the open end of the inner conduit through the annular passage, there will be little or no difference in the rate of discharge through the uniformly spaced openings along the length of the conduit.

For certain high rates of fluid introduction employed, the relatively high pressure in the zone where reversal of fluid flow was taking place was on the order of 1.5 in. of Hg. gauge; whereas the pressure within the annular passage, at points removed from such zone, was on the order of 1.12 in. of Hg. gauge. This pressure difference, upon first consideration, will undoubtedly seem slight. But when it is recognized that the pressure within the reaction zone surrounding the nested conduits is often atmospheric or above, then it will be seen that the pressure tending to inject fluid into the parts of the contact mass which surround and are adjacent to the open end of the inner conduit is at least approximately 25% greater than that acting to force fluid to pass through the openings spaced away from the open end of such conduit. Such very substantial pressure difference and resultant non-uniformity of introduction may seriously interfere with the uniform control of temperature throughout the contact mass which is highly desirable, if not essential, during transforming periods as well as in any subsequent regeneration of the bed of contact mass in situ.

Of course, where lower velocities are employed, the non-uniformity of introduction will be relatively less. High velocities, i. e., high rates of feed, are likely to be encountered in large commercial converters having conduits of the order of 15, 20 or 25 feet long, rather than in small converters having conduits, say 5 or 6 feet long. This is because, as the size of the converter and length of conduits increase, it is not practical to increase the diameter thereof and hence the rate of flow must be increased to maintain any chosen rate of introduction per unit volume of contact mass.

The several figures of the appended drawing, as above described, show apparatus in variously modified form adapted to provide a uniform rate of emission or venting of fluid through the perforations throughout the length of the conduits. The apparatus of each figure accomplishes this desired result by confining the zone of high pressure away from the outlet perforations so that the pressure of the fluid will be substantially reduced before the fluid reaches outlet perforations adjacent such zone.

Where herein or in the appended claims the "top" of the cup-like structure which faces the open end of the inner conduit is spoken of, it will be understood to mean the open end, in the same sense that the top of an ordinary cup is understood, although the cup-like structure may be upside down or in any other position, depending upon the position of the nested conduits. While the latter are shown mounted in the upper tube sheet, it is also contemplated that they may be turned upside down and mounted in the lower tube sheet, or may assume any other desired position.

While the invention is herein specifically illustrated in connection with uses for which it is adapted, yet it will be understood that the invention is in no way limited thereby and applies broadly to operations and apparatus involving fluid flow or distribution.

What I claim is:

1. Apparatus for the reverse flow passage and distribution of fluid which comprises a double or nested conduit assembly having an inner conduit surrounded by an outer conduit, fluid communication between said inner conduit and said outer conduit being provided through an opening in an end of the former which terminates within said outer conduit adjacent to but in slightly spaced relation with the adjacent closed end of said outer conduit, said outer conduit having perforations or openings through the walls thereof, spaced from each other around and throughout the length of the same, and a fluid diversion member within said outer conduit and positioned in relation to the last-mentioned end of said inner conduit and to the said opening therein so as to reverse the direction of flow of fluid passing from said inner conduit into the space between said inner conduit and the said outer conduit of the aforesaid nested assembly while confining fluid, during reversal of its direction of flow in spaced relation with adjacent portions of the walls of said outer conduits, which have perforations or openings therethrough, said diversion member not substantially overlapping said inner conduit and not extending between said outer conduit and said inner conduit for any substantial proportion of the length of the latter, thereby to accomplish in desired manner the reversal of direction of flow of fluid passing from said inner conduit into the passage surrounding the latter and located within said outer conduit without interposing any substantial obstruction to the flow of fluids through those perforations in the outer conduit located perpendicular to the longitudinal axis of said inner conduit along substantially the entire length of the latter.

2. For use in combination with contact or catalytic converters, apparatus for the reverse flow passage and distribution of fluid which comprises a double or nested conduit assembly, the inner conduit thereof being spaced from the outer one substantially throughout the length thereof and extending through one end of the said outer conduit, the other end of said inner conduit being confined within said outer conduit and being located adjacent but in spaced relation with the adjacent closed end of the said outer conduit, said inner conduit having an opening in the end thereof which is located outside of said outer conduit for the induction of fluid and also having an opening in the said other end thereof to allow fluid to pass from the said inner conduit to the passageway of the said nested assembly located between said inner conduit and said outer conduit; said outer conduit having openings through the walls of the same spaced from each other around and throughout the length thereof; and fluid diversion means comprising curved structure positioned within said outer conduit and cooperating with and located adjacent the last-mentioned end of said inner conduit so as to reverse the direction of flow of fluids emitted from said inner conduit through the last-mentioned opening therein while maintaining the fluid during reversal of its direction of flow in a confined zone spaced from adjacent portions of the walls of the said outer conduit which have openings therethrough, said diversion means having a small dimension in the direction of the length of said nested conduit assembly and neither overlapping said inner conduit to any substantial extent nor extending between said outer conduit and said inner conduit for any substantial proportion of the length of the latter, thus providing apparatus for substantially uniform distribution of fluid from the outer conduit of a nested conduit assembly throughout the entire length thereof.

3. Apparatus for the reverse flow passage and distribution of fluid adapted to be embedded in or surrounded by a contact mass, which comprises a double or nested conduit assembly, the inner conduit thereof being spaced from the outer one along its length, the outer conduit having a closed end and openings spaced from each other around and along the length thereof to provide for the venting of fluid, said inner conduit having an open end terminating adjacent but spaced from the closer end of the outer conduit, the aforesaid openings continuing to the end of said outer conduit beyond the said open end of the inner conduit, and a cup-like structure, adapted to effect reversal of flow of fluid, facing said open end and spaced therefrom, the mouth of said cup-like structure being located adjacent said open end of the said inner conduit and being sufficiently large so as to receive substantially all of the fluid emitted from said inner conduit through the open end thereof and smaller than said outer conduit so as to permit passage of fluid between either face of said cup-like structure and adjacent conduit surfaces.

4. Apparatus for effecting chemical reactions comprising a casing providing a reaction chamber, the latter being adapted to contain a contact material, a series of elongate apertured distributing units or conduit assemblies and a series of apertured outlet conduits extending within said reaction chamber in interspersed relation with each other and in approximate parallelism, each of said distributing units or conduit assemblies comprising an inner conduit and an outer conduit in nested relation, said inner conduit being spaced from said outer conduit along the length of the latter and having an opening in an end thereof terminating adjacent to but in spaced relation with the adjacent closed end of the outer conduit, said opening permitting reactant fluid to flow from said inner conduit into and in reverse direction through the passage between said inner conduit and said outer conduit, and said outer conduit having apertures or distribution ports spaced from each other around and throughout the length thereof, and fluid diversion structure within the said outer conduit and positioned in substantially fixed relation to said inner conduit and to the said opening therein so as to reverse the direction of flow of fluid emitted from said inner conduit through the said opening therein while maintaining the fluids during reversal of their dierction of flow confined and spaced from the adjacent portions of the walls of said outer conduit which have perforations or openings therein, said diversion structure neither substantially overlapping said inner conduit nor extending between said outer conduit and said inner conduit for any substantial proportion of the length of the latter.

RAYMOND C. LASSIAT.